(12) United States Patent
Zwart

(10) Patent No.: US 6,428,733 B1
(45) Date of Patent: Aug. 6, 2002

(54) ROTATIONAL MOLDING

(75) Inventor: Gerrit Zwart, Goirle (NL)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/489,808

(22) Filed: Jan. 24, 2000

(30) Foreign Application Priority Data

Feb. 17, 1999 (EP) .............................................. 99102703

(51) Int. Cl.$^7$ .............................. B05D 7/00; B02B 3/00; B28B 1/02
(52) U.S. Cl. ......................... 264/310; 264/140; 241/21; 241/15; 427/222
(58) Field of Search ...................... 241/21, 15; 264/310, 264/311, 140; 427/212, 222

(56) References Cited

U.S. PATENT DOCUMENTS

| | | | |
|---|---|---|---|
| 2,560,082 A | * | 7/1951 | Brown |
| 3,802,909 A | * | 4/1974 | Rockett et al. |
| 3,925,096 A | * | 12/1975 | Karkov |
| 4,082,586 A | * | 4/1978 | Osment |
| 5,270,076 A | * | 12/1993 | Evers |
| 5,759,472 A | | 6/1998 | DeFranco et al. .......... 264/310 |
| 6,321,804 B1 | * | 11/2001 | Mangold |

FOREIGN PATENT DOCUMENTS

| | | |
|---|---|---|
| FR | 2233156 | 6/1974 |
| GB | 1184717 | 3/1970 |

\* cited by examiner

*Primary Examiner*—Jan H. Silbaugh
*Assistant Examiner*—Geoffrey P. Shipsides
(74) *Attorney, Agent, or Firm*—Rankin, Hill, Porter & Clark LLP

(57) ABSTRACT

The present invention provides a new and improved method of using a volatile liquid color system to prepare colorant-coated polymeric resin powders for use in rotational molding. The method according to the present invention includes simultaneously feeding polymeric resin pellets or granules and a volatile liquid color system into a grinding mill to produce a colorant-coated polymeric resin powder for use in rotational molding. During grinding, the volatile liquid color system coats the surface of the freshly ground polymeric resin powder and dries, leaving no residues that will volatilize during rotational molding or exude from the surface of rotationally molded parts during molding. The method of the present invention eliminates the need for additional processing steps after resin grinding, such as distributive mixing and drying. Rotational molded articles produced according to the present invention exhibit excellent color uniformity.

20 Claims, No Drawings

ROTATIONAL MOLDING

FIELD OF INVENTION

The present invention concerns rotational molding. More particularly, the invention concerns a method of using a volatile liquid color system to prepare colorant-coated polymeric resin powders for use in rotational molding.

BACKGROUND

Rotational molding is used to produce hollow containers and other products of larger size and complicated structure which cannot be readily molded by other conventional molding techniques, such as injection molding and sheet thermoforming. Typical products produced by rotational molding include, for example, gasoline tanks, casks, storage tanks and toys.

Rotational molding includes the steps of feeding a polymeric resin powder into a mold, heating the mold from the exterior while rotating the mold thereby melting the powder and forming a molten polymeric layer within the mold, then cooling the mold to solidify the polymeric layer, and finally separating the molded product from the mold. An example of a prior art machine for performing rotational molding may be found in Friesen U.S. Pat. No. 4,738,815. An example of a prior art polymeric resin powder for use in rotational molding may be found in Inoue et al. U.S. Pat. No. 4,587,318.

As discussed in the Inoue et al. '318 patent, polymeric resin powders used in rotational molding can be mixed with pigments so as to impart color to the molded product. Conventionally, such pigments have been added to the polymeric resin powders in the form of dry powders or solids. Unfortunately, these dry pigment powders or solids often present handling and mixing problems. Specifically, dry pigment powders or solids may form undesirable dust or they may unevenly mix with the polymeric resin powders resulting in non-uniform color distribution in the molded product.

In the past, attempts have been made to use conventional liquid color systems in rotational molding. However, use of such conventional liquid color systems has not been particularly successful. Conventional liquid color systems have a tendency not to mix uniformly with polymeric resin powders. Another problem is in the formation of lumps or other unwanted agglomerates. During rotational molding, residual volatile components in conventional liquid color systems can evolve as gases which can lead to the formation of pin holes and other surface imperfections in the rotationally molded product. Additionally, conventional liquid color systems have a tendency to exude from the rotationally molded product as the polymer resin powder fuses during molding, forming tacky films on the surface of the molded product.

DeFranco et al. U.S. Pat. No. 5,759,472 discloses a volatile liquid color system and a method of using the same which overcame many of the aforementioned problems associated with the use of dry pigment powders or solids and conventional liquid color systems in rotational molding. The method disclosed in the DeFranco et al. '472 patent involves providing a volatile liquid color system, providing a polymeric resin powder, mixing the liquid color system and the polymeric resin powder in a distributive mixer to produce a mixture (which is preferably then oven dried), and then feeding the mixture into a rotational molding machine to produce a colored rotationally molded product.

Although the method disclosed in the DeFranco et al. '472 patent effectively overcame many of the problems associated with the use of dry pigment powders or conventional liquid color systems in rotational molding, it added the additional steps of mixing the polymeric resin powder and volatile liquid color system together in a distributive mixer and drying the mixture prior to use in a rotational molding operation. A method that would eliminate these additional steps would greatly simplify the process.

SUMMARY OF THE INVENTION

The present invention provides a new and improved method of using a volatile liquid color system to prepare polymeric resin powders for use in rotational molding. According to the present invention, polymeric resin pellets or granules and a volatile liquid color system are simultaneously fed into a grinding mill used to reduce polymeric resin pellets or granules to a fine powder for use in rotational molding. During grinding, the volatile liquid color system uniformly mixes with and coats the surface of the newly formed polymeric resin powder particles. The increase in temperature caused by the grinding forces coupled with the high volume air flow through the grinder causes the volatile components of the volatile liquid color system to fully evaporate from the surface of the powder particles, leaving them completely dry and suitable for use in rotational molding without any additional process steps. Surprisingly, the method does not clog or contaminate the grinder or produce a colorant-coated polymeric resin powder having lumps or other unwanted agglomerates. Rotationally molded products produced according to the method of the present invention exhibit color uniformity at least as good as, and in many cases superior to, products produced according to the method disclosed in the DeFranco et al. '472 patent.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The method of the present invention utilizes a volatile liquid color system. Throughout the specification and in the claims, the term "volatile liquid color system" should be understood to refer to any liquid color system having an upper working viscosity of less than about 10,000 centipoise that following exposure to the conditions encountered during polymeric resin grinding operation does not leave behind any residue which can volatilize at temperatures typically encountered during rotational molding operations or exude from a rotationally molded part during such molding operations. The preferred volatile liquid color system for use in the invention is disclosed in U.S. Pat. No. 5,759,472 to DeFranco et al., the specification of which is hereby incorporated by reference. However, it will be appreciated that other volatile liquid color systems, such as water-based liquid color dispersions and other non-water-based volatile liquid color systems, may be suitable for use in the invention provided they meet the criteria set forth herein.

Thus, in the preferred embodiment, the volatile liquid color system comprises from about 10% to about 75% by weight carrier, from about 0% to about 15% by weight water, from about 0.01% to about 10% by weight dispersant, from about 10% to about 80% by weight colorant, and from about 0% to about 10% by weight additives. More preferably, the volatile liquid color system comprises from about 15% to about 65% by weight carrier, from about 1% to about 14% by weight water, from about 0.02% to about 8% by weight dispersant, from about 15% to about 75% by weight colorant, and from about 0% to about 8% by weight additives.

In the preferred embodiment, the carrier comprises a material selected from the group consisting of propylene glycol, ethylene glycol, diethylene glycol, tri(ethylene glycol), glycerin and mixtures of two or more of these materials. A preferred carrier is propylene glycol. More preferably, the carrier is food grade propylene glycol such as is sold by the Avatar Corporation. Preferably, any water employed in the volatile liquid color system is distilled. More preferably, any water employed in the volatile liquid color system is deionized.

The dispersant used in the volatile liquid color system is dependent upon the type of colorant and carrier being used. The dispersant must be soluble in the carrier and must associate strongly with the particles of colorant as they are separated from each other during mixing, thereby preventing the particles from reattaching to each other during storage and use. Examples of suitable dispersants include polyvinylpyrrolidone (e.g., SOKOLAN HP50 from BASF), sodium salt of polyacrylic acid (molar mass from 1,200-250,000), sodium/iron salt of lignosulfonic acid (e.g., MARASPERSE CBA-1), sodium salt of condensed naphthalenesulfonic acid, sodium naphthalene sulfonate and sodium salt of polymeric carboxylic acid.

Various colorants may be utilized in connection with the volatile liquid color system. The term "colorant" when used herein denotes any conventional inorganic or organic pigment, organic dyestuff or carbon black. Those skilled in the art will be aware of suitable inorganic pigments, organic pigments and dyestuffs useful as colorants. Such materials are described, for example, in Kirk-Othmer Encyclopedia of Chemical Technology, Third Edition, Vol. 6, pages 597–617, which is incorporated by reference herein; examples are:

(1) inorganic types such as titanium dioxide, carbon black, iron oxide, zinc chromate, cadmium sulfides, chromium oxides, sodium aluminum silicate complexes, such as ultramarine pigments, metal flakes and the like; and (2) organic types such as azo and diazo pigments, phthalocyanines, quinacridone pigments, perylene pigments, isoindolinone, anthraquinones, thioindigo, solvent dyes and the like.

Various conventional additives or mixtures thereof may also be included in the volatile liquid color system such as, for example, lubricants, antistats, impact modifiers, antimicrobials, light stabilizers, filler/reinforcing materials (e.g., CaCO), heat stabilizers, release agents, rheological control agents such as clay, etc.

The volatile liquid color system may be prepared by thoroughly mixing the components together using any of the methods of preparing liquid color systems which are known in the art. Preferably, the volatile liquid color system is prepared by charging the liquid components into a mixing vessel which is equipped with Cowles mixing blade. The blade is concentrically centered in the mixing vessel, and the depth of the blade from the bottom of the mixing vessel is about one-half the blade diameter. Initially, only the liquid components of the volatile liquid color system are added to the mixing vessel where they are thoroughly mixed together under mild agitation. The colorants and additives are then added to the mixing vessel gradually under mild agitation. When all of the components of the volatile liquid color system have been added to the mixing vessel, the agitation is increased until the blade tip speed is at least 5,500 ft/min. The agitation is continued for at least five minutes, and a measurement of dispersion quality is made, typically with a Hegman grind gauge, according to ASTM 1210-79. A Hegman reading of 7.0 or above is satisfactory.

It is important that the volatile liquid color system used in the invention displays an evaporation rate of from about 0.01 to about 0.36, and preferably a rate of from about 0.015 to about 0.20. The evaporation rate is a critical factor in providing a suitable volatile liquid color system for use in rotational molding. Evaporation rate is determined by using the test procedure set forth in ASTM D3539-87 (Reapproved 1992) using an automatic evaporometer whereby the relative evaporation rate for n-butyl acetate is 1.0.

The method of the present invention can be practiced using any one or a combination of the various polymeric resins commonly used in rotational molding, the composition of which are well known in the art. Such polymeric resins include, for example, polymers and copolymers of olefins such as polypropylene and ethylene-vinyl acetate copolymer; polyethylene materials such as low-density polyethylene, high-density polyethylene, and linear low-density polyethylene; engineered resins such as acrylonitrile-butadiene-styrene copolymer and polyphenylene oxide; polyamides like nylon, nylon 66, nylon 11 or nylon 12; and mixtures of any of the foregoing. The size of polymeric resin pellets or granules used in the invention is not critical. Conventionally, resin pellets or granules have a diameter of about 3 mm before grinding.

The method of the present invention utilizes a grinding mill designed to reduce polymeric resin pellets or granules to a fine powder suitable for use in rotational molding. It will be appreciated that the type of polymeric resin grinding mill used is not per se critical, and that any conventional polymeric resin grinding mill may be used. Suitable examples include, for instance, the Model SP02 polymer grinding machine available from Smile Plastics of Susteren, the Netherlands, and any of the IPFM type pulverizers available from H.-I. Pallmann GmbH & Co. of Zweibrücken, Germany.

Conventional polymeric resin grinding mills typically consist of two circular metal disks positioned face-to-face with a large number of radial grooves cut into their opposing faces. The radial grooves have knife edges machined into one edge. The knife edges on one disk face in the opposition direction to the knife edges on the opposite disk. One disk has a hole through its center axis through which resin pellets or granules can be introduced. Typically, this disk does not rotate, but can be moved relative to the opposing disk so that the clearance between the two disks can be precisely adjusted over a range of from about 0.002 inches to about 0.020 inches. The opposing disk has no central hole and is rotated by a motor drive system. The rotational speed is typically adjustable over a range of from about 50 r.p.m. to about 200 r.p.m.

During grinding operations, resin pellets or granules are fed through the central opening in the static disk into a space between the two disks which defines a grinding chamber. Upon contacting the face of the rotating disk, the pellets or granules and centrifugally accelerated radially. The actual grinding or pulverization of the pellets or granules is accomplished as the pellets or granules are frictionally engaged between the static and rotating disks. The grinding action incorporates the forces of shearing, impact, and friction. Various factors influence the fineness of the resin powder, including the design of the grinding tracks on the rotating and static disks, the speed of the rotating disk, and the gap between the rotating and static disks. It will be appreciated that final powder size is not critical. Typically, polymeric resins are ground into powders having an average particle diameter of about 500 μm for use in rotational molding, but depending upon the particular application powders can have a range of diameters from finer than about 100 μm to as coarse as more than 2 mm.

Typically, the two grinding disks are arranged inside a circular housing which catches the particles of ground resin as they are flung outward from the rotating disk. Air or some other dry gas such as nitrogen is fed into the grinding chamber at a sufficient volume and flow velocity to simultaneously cool both the metal disks and the freshly ground resin and to convey the resin powder around the periphery of the housing to an exit duct. Typically, after the newly ground resin powder passes through the exit duct it is conveyed pneumatically to a stack of sieve screens. Oversized particles are removed from the sieve and recycled back into the grinder for additional processing. Undersized particles, which are sometimes referred to as fines, may also be removed, if necessary. The sieved resin powder is then collected in containers.

According to the method of the present invention, a suitable polymeric resin in the form of pellets or granules and a suitable volatile liquid color system are simultaneously fed into the grinding mill. To insure color uniformity, the ratio of polymeric resin fed into the grinding mill to volatile liquid color system fed into the grinding mill should be kept constant. Preferably, the volatile liquid color system is dripped from a pipe or sprayed onto the resin pellets or granules in the feed stream before they enter the grinding chamber defined by the space between the two grinding disks. Alternatively, the volatile liquid color system can be dripped from a pipe or sprayed directly into the grinding chamber of the grinding mill, or it can be sprayed or dripped into the powder as it passes from the housing into the exit duct.

During grinding, the average particle size of the polymeric resin pellets or granules is rapidly reduced, and there is a corresponding rapid increase in the total surface area and temperature of the freshly ground polymeric resin material. The vigorous mechanical action of the grinding mill and the high volume and high velocity of air flow causes the volatile liquid color system to become spread out onto and coat the new surface area of the polymeric resin particles. Because the volatile liquid color system is being thinned as it spreads onto the surface of the resin powder immediately after the very rapid heat up caused by grinding, evaporation of the non-colorant volatile components of the volatile liquid color system starts immediately and is completed very quickly. Evaporation is also significantly enhanced by the high-volume air flow that is typically used in grinding mills for cooling and powder movement purposes. Virtually all of the non-colorant components of the volatile liquid color system are evaporated during a single pass of the material through a grinding mill. In the case of water-based liquid color dispersions, real drying is observed. In the case of non-water based volatile liquid color systems, the drying may be a combination of absorption in the micro-cavities of the freshly ground polymeric resin particles coupled with evaporation of the volatile components. In either case, there are no residue remaining on the freshly ground resin powder which will later volatilize when the resin powder is used in rotational molding operations. Thus, according to the present invention, the polymeric resin material is powdered, coated with a volatile liquid color system and dried during the grinding step alone.

To enhance the drying of the freshly colorant-coated powder, the grinding mill should be operated at the highest possible temperature. The operating temperature will be restricted primarily by the melt behavior of the particular polymeric resin material used. Preferably, the grinding mill operational temperature should be above about 60° C. to insure good drying conditions. In one preferred embodiment of the invention, the resin material comprises polyethylene with a melt index of about 1 to about 9 at about 80–85° C. In this embodiment, the cooling/transport airflow is kept high, but is restricted to maintain a temperature in the grinding mill in excess of 60° C. Those of ordinary skill in the art will appreciate that these grinding conditions are markedly different from conventional polymer grinding conditions where it is preferred to keep the temperature in the grinding mill as low as possible for the purpose of improving the grinding capacity of the mill. Applicants believe that the internal cooling caused by the evaporation of the volatile liquid color system inside the grinding mill helps keep the grinding capacity higher than would otherwise be expected at the elevated operational temperatures. Depending upon the properties of the specific polymeric resin employed and the operating conditions of the grinding mill, grinding capacity can vary from about 1 kilo per hour to more than 200 kilos per hour.

One of ordinary skill in the art would expect that the introduction of a volatile liquid color system to a grinding mill during grinding of polymeric resin pellets or granules would result in considerable clogging and contamination of the grinding mill. But this was surprisingly discovered not to be the case. The movement of the resin powder through the grinding chamber together with the high volume of air used to transport the powder and cool the grinder results in a vigorous scrubbing or abrasive action which removes the volatile liquid color system from the blades of the grinding disks and from the surfaces of the grinding chamber. Moreover, the vigorous mechanical action of the grinding mill causes the volatile liquid color system to be dispersed uniformly throughout the newly formed powder whereupon the non-colorant components thereofcan be rapidly evaporated.

The distributive mixing step disclosed in the DeFranco et al. '472 patent is completely eliminated from the method of the present invention. Moreover, there is no need to subject colorant coated resin powders to drying in an oven prior to use in rotational molding because the volatile components of the volatile liquid color system are fully evaporated during the grinding operation. It will be appreciated that the same amount of energy is needed to grind the polymeric resin pellets or granules into powder in both methods, but the present method utilizes the rapid changes in the particle size, surface area, and temperature caused by the grinding to accomplish the same objectives as the distributive mixing step (and oven drying step) taught in the DeFranco et al. '472 patent.

It will be appreciated that the ratio of polymeric resin pellets or granules to volatile liquid color system simultaneously fed to the grinding mill will vary based upon the color requirements of the end product. In general, the weight ratio of polymeric resin pellets or granules to volatile liquid color system simultaneously fed into the grinding mill can vary within the range of from about 2,000:1 (i.e., 99.95% by weight polymeric resin and 0.05% by weight volatile liquid color system) to about 25:1 (i.e., 96% by weight polymeric resin and 4% by weight volatile liquid color system).

Powdered polymeric resin particles coated with a volatile liquid color system during grinding according to the present invention may be used in any conventional rotational molding machine to produce molded products of various configurations without any further treatment. In one embodiment of the present invention, the method includes the steps of simultaneously feeding polymeric resin pellets or granules and a volatile liquid color system at a constant ratio to a grinding mill to produce a colorant-coated polymeric resin powder, feeding said colorant-coated polymeric resin powder into a rotating mold heated to a temperature of from about 350° F. to about 650° F. thereby forming a molten polymeric layer within the mold, allowing the molten polymeric layer to solidify and form a molded article, and removing the molded article from the mold.

The present invention will be more fully understood from the following examples which are intended only to illustrate the invention and should not be construed as imposing limitations upon the claims. All quantities, percentages and ratios are on a weight basis unless otherwise indicated.

EXAMPLE 1

A volatile liquid color system was prepared according to methods well known in the art comprising 30 parts by weight glycerin as a carrier, 28 parts by weight distilled water, 2 parts by weight MARASPERSE CBA-1 as a dispersant, and 40 parts by weight pigment-grade carbon black (available from Cabot as MONARCH 800) as a colorant. High-density polyethylene resin in the form of pellets or granules and the volatile liquid color system were simultaneously fed into a grinding mill of the configuration described above at a constant weight ratio of about 159:1 (i.e., 99.375% by weight polymeric resin pellets or granules and 0.625% volatile liquid color system). The temperature of the grinding mill and cooling/transport air was maintained at about 65° C. After grinding, the polymeric resin was in the form of a powder capable of passing through a 35 mesh sieve (i.e., the particles had an average diameter of about 500 $\mu$m or less). The finished ground resin powder had a colorant content of about 0.25% by weight and contained less than 0.05% by weight of the other components of the volatile liquid color system. The colorant-coated polymeric powder was fed into a rotational molding machine to produce a rotationally molded article which exhibited excellent color uniformity.

EXAMPLE 2

A volatile liquid color system was prepared according to methods well known in the art comprising 36.5 parts by weight propylene glycol as a carrier, 25 parts by weight distilled water, 3.5 parts by weight SOKOLAN H-50 as a dispersant, and 35 parts by weight pigment-grade carbon black (available from Columbian as RAVEN 1035) as a colorant. Linear low-density polyethylene resin in the form of pellets or granules and the volatile liquid color system were simultaneously fed into a grinding mill of the configuration described above at a constant weight ratio of about 140:1 (i.e., 99.29% by weight polymeric resin pellets or granules and 0.71% volatile liquid color system). The temperature of the grinding mill and cooling/transport air was maintained at about 65° C. After grinding, the polymeric resin was in the form of a powder capable of passing through a 35 mesh sieve (i.e., the particles had an average diameter of about 500 $\mu$m or less). The finished ground resin powder had a colorant content of about 0.245% by weight and contained less than 0.05% by weight of the other components of the volatile liquid color system. The colorant-coated polymeric powder was fed into a rotational molding machine to produce a rotationally molded article which exhibited excellent color uniformity.

Comparative Example 3

Not an Embodiment of the Present Invention

For comparative purposes, a colorant-coated polymeric resin powder for use in rotational molding was prepared in accordance with the method disclosed in the DeFranco et al. '472 patent. The same type of linear low-density polyethylene pellets as used in Example 2 were fed into a grinding mill of the configuration described above and reduced to a rotational molding-grade resin powder capable of passing through a 35 mesh sieve (i.e., the particles had an average diameter of about 500 $\mu$m or less). Six pounds of the powdered resin was then charged into a Henschel Prodex blender such that the container was 75% full. The blender was started and the same volatile liquid color system as used in Example 2 was added dropwise over a sixty second interval into the blender until the weight ratio of resin powder to volatile liquid color system was about 140:1 (i.e., 99.29% by weight polymeric resin pellets and 0.71% volatile liquid color system). The resin powder and volatile liquid color system were thoroughly blended for an additional two minutes to form a mixture having a homogenous appearance. The mixture was found to contain about 0.245% by weight colorant and about 0.35% by weight of the other components of the volatile liquid color system. The mixture was then subjected to drying in a forced-air oven at 100° C. for approximately six hours. After drying, the mixture was found to contain about 0.245% by weight colorant and about 0.05% of the other components of the volatile liquid color system. Comparative Example 3 demonstrates that the method of the present invention can produce a colorant-coated polymeric resin powder suitable for use in rotational molding operations that is equal to or superior to the colorant-coated polymeric resin powder according to the method disclosed in the DeFranco et al. '472 patent without the need for distributive mixing and drying steps.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of preparing colorant-coated polymeric resin powder for use in rotational molding comprising the steps of:
   A. providing a polymeric resin in the form of pellets or granules;
   B. providing a volatile liquid color system;
   C. simultaneously feeding said polymeric resin and said volatile liquid color system into a grinding mill; and
   D. grinding said polymeric resin pellets or granules using said grinding mill to form a dry colorant-coated polymeric resin powder suitable for use in rotational molding, wherein volatile components of said volatile liquid color system evaporate during said grinding and said polymeric resin is powdered, coated with said volatile liquid color system and dried during said grinding alone.

2. The method as set forth in claim 1 wherein said volatile liquid color system is dripped or sprayed onto said polymeric resin pellets or granules as they are being fed into said grinding mill.

3. The method as set forth in claim 1 wherein said volatile liquid color system is dripped or sprayed into the grinding chamber of said grinding mill as said polymeric resin pellets or granules are being fed into said grinding mill.

4. The method as set forth in claim 1 wherein the temperature of said grinding mill is maintained above about 60° C. but below the melt temperature of said polymeric resin being ground by adjusting the temperature and flow rate of cooling/transporting air passing through the grinding mill.

5. The method as set forth in claim 1 wherein after grinding said colorant-coated polymeric resin powder has an average particle diameter of from about 100 µm to about 2 mm.

6. The method as set forth in claim 5 wherein after grinding said colorant-coated polymeric resin powder has an average particle diameter of less than about 500 µm.

7. The method as set forth in claim 1 wherein said volatile liquid color system is dripped or sprayed onto said polymeric resin powder as it passes from the housing through the exit duct of the grinding mill.

8. The method as set forth in claim 1 further comprising the step of:
E. feeding said colorant-coated polymeric resin powder into a rotational molding machine to produce a colored rotationally molded product.

9. The method as set forth in claim 1 wherein after said grinding step said colorant-coated polymeric resin powder contains no residual liquid which can volatilize when said polymeric resin powder is used in rotational molding or which can exude to the surface and form a tacky film on the surface of a rotationally molded product.

10. The method as set forth in claim 1 wherein the ratio of the volume of said polymeric resin pellets or granules fed into said grinding mill to the volume of said volatile liquid color system feed into said grinding mill is constant.

11. A method of preparing colorant-coated polymeric resin powder for use in rotational molding comprising the steps of:
A. providing a polymeric resin in the form of pellets or granules;
B. providing a volatile liquid color system comprising from about 10% to about 75% by weight carrier, from about 0% to about 15% by weight water, from about 0.1% to about 10% by weight dispersant, and from about 10% to about 80% by weight colorant, said carrier comprising one or more materials selected from the group consisting of propylene glycol, ethylene glycol, diethylene glycol, tri(ethylene glycol), and glycerin;
C. simultaneously feeding said polymeric resin pellets or granules and said volatile liquid color system into a grinding mill; and
D. grinding said polymeric resin pellets or granules using said grinding mill to produce a dry colorant-coated polymeric resin powder for use in rotational molding, wherein volatile components of said volatile liquid color system evaporate during said grinding and said polymeric resin is powdered, coated with said volatile liquid color system and dried during said grinding alone.

12. The method as set forth in claim 11 wherein said volatile liquid color system has an evaporation rate of from about 0.01 to about 0.36 based on the ASTM test procedure D3539-87 (Reapproved 1992) using an automatic evaporometer whereby the relative evaporation rate for n-butyl acetate is 1.0.

13. The method as set forth in claim 11 wherein said polymeric resin comprises one or more selected from the group consisting of homopolymers and copolymers of olefins, acrylonitrilebutadiene-styrene copolymer, polyphenylene oxide, and polyamides.

14. The method as set forth in claim 11 wherein during said step C the ratio of the amount of said polymeric resin pellets or granules to the amount of said volatile liquid color system simultaneously fed into said grinding mill is constant, said ratio being selected within the range of from about 2,000:1 to about 25:1 by weight.

15. The method as set forth in claim 11 wherein said colorant comprises a material selected from the group consisting of an inorganic pigment, an organic pigment, an organic dyestuff, carbon black, and mixtures thereof.

16. The method as set forth in claim 11 wherein said dispersant serves to maintain the uniform dispersion of said colorant within said carrier.

17. The method as set forth in claim 11 wherein said volatile liquid color system further comprises up to about 10% by weight of one or more additives selected from the group consisting of antimicrobials, lubricants, fillers, reinforcing materials, light stabilizers, heat stabilizers, release agents, antistats, impact modifiers, and mixtures thereof.

18. A method of rotationally molding a product comprising the steps of:
A. providing a polymeric resin in the form of pellets or granules;
B. providing a volatile liquid color system comprising from about 10% to about 75% by weight carrier, from about 0% to about 15% by weight water, from about 0.1% to about 10% by weight dispersant, and from about 10% to about 80% by weight colorant, said carrier comprising one or more materials selected from the group consisting of propylene glycol, ethylene glycol, diethylene glycol, tri(ethylene glycol), and glycerin;
C. simultaneously feeding said polymeric resin pellets or granules and said volatile liquid color system into a grinding mill;
D. grinding said polymeric resin pellets or granules using said grinding mill to produce a dry colorant-coated polymeric resin powder for use in rotational molding wherein volatile components of said volatile liquid color system evaporate during said grinding and said polymeric resin is powdered, coated with said volatile liquid color system and dried during said grinding alone; and
E. feeding said colorant-coated polymeric resin powder into a rotational molding machine to produce a colored rotationally molded product.

19. The method as set forth in claim 18 wherein said step E further includes the steps of feeding said colorant-coated polymeric resin powder into a rotating mold heated to a temperature of from about 350° F. to about 650° F. thereby melting said colorant-coated polymeric resin powder to form a molten polymeric layer within said mold, allowing said molten polymeric layer to solidify within said mold to form a colored rotationally molded product, and removing said colored rotationally molded product from said mold.

20. The method as set forth in claim 18 wherein subsequent to grinding said colorant-coated polymeric resin powder is capable of passing through a 35 mesh sieve.

* * * * *